(12) United States Patent
Natanzon et al.

(10) Patent No.: US 10,992,458 B2
(45) Date of Patent: Apr. 27, 2021

(54) BLOCKCHAIN TECHNOLOGY FOR DATA INTEGRITY REGULATION AND PROOF OF EXISTENCE IN DATA PROTECTION SYSTEMS

(71) Applicant: EMC IP Holding Company LLC, Hopkinton, MA (US)

(72) Inventors: Assaf Natanzon, Tel Aviv (IL); David Zlotnick, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 283 days.

(21) Appl. No.: 16/249,783

(22) Filed: Jan. 16, 2019

(65) Prior Publication Data

US 2020/0228323 A1 Jul. 16, 2020

(51) Int. Cl.
| | |
|---|---|
| *H04L 29/06* | (2006.01) |
| *H04L 9/06* | (2006.01) |
| *H04L 9/08* | (2006.01) |
| *H04L 9/14* | (2006.01) |
| *H04L 9/32* | (2006.01) |

(52) U.S. Cl.
CPC .......... *H04L 9/0643* (2013.01); *H04L 9/0894* (2013.01); *H04L 9/14* (2013.01); *H04L 9/3236* (2013.01); *H04L 2209/38* (2013.01)

(58) Field of Classification Search
CPC ....... H04L 9/0643; H04L 9/0894; H04L 9/14; H04L 9/3236; H04L 2209/38; H04L 9/3239; H04L 63/00; H04L 9/3297; G06F 11/1448; G06F 11/1458; G06F 21/6245; G06F 21/64
See application file for complete search history.

(56) References Cited

U.S. PATENT DOCUMENTS

| | | | |
|---|---|---|---|
| 10,121,025 B1* | 11/2018 | Rice | G06F 21/10 |
| 2002/0196685 A1* | 12/2002 | Topham | H04L 9/3236 |
| | | | 365/200 |
| 2017/0046651 A1* | 2/2017 | Lin | G06Q 10/0631 |
| 2018/0018723 A1 | 1/2018 | Nagla et al. | |
| 2018/0082024 A1 | 3/2018 | Curbera et al. | |
| 2018/0082296 A1 | 3/2018 | Brashers | |
| 2018/0285479 A1 | 10/2018 | Mackay et al. | |
| 2018/0285839 A1 | 10/2018 | Yang et al. | |
| 2020/0021446 A1* | 1/2020 | Roennow | H04L 63/0478 |

(Continued)

FOREIGN PATENT DOCUMENTS

WO 2018089843 5/2018

OTHER PUBLICATIONS

U.S. Appl. No. 16/249,761, filed Jan. 16, 2019.

(Continued)

*Primary Examiner* — Mahfuzur Rahman
(74) *Attorney, Agent, or Firm* — Workman Nydegger (57) ABSTRACT

One example method includes creating a backup of data, creating metadata associated with the backup, hashing the backup to create a backup hash, obtaining a key from a blockchain, generating an aggregate hash of a combination that includes the key and the backup hash, and transmitting the aggregate hash to a blockchain network. Because the aggregate hash is not modifiable when stored in a blockchain, an immutable record exists that establishes when a particular backup was created.

18 Claims, 4 Drawing Sheets

(56) References Cited

U.S. PATENT DOCUMENTS

2020/0067697 A1* 2/2020 Puddu .................. G06F 21/602

OTHER PUBLICATIONS

U.S. Appl. No. 16/249,791, filed Jan. 16, 2019.
International Search Report and Written Opinion for PCT/US2019/053879 dated Nov. 28, 2019.
International Search Report and Written Opinion for PCT/US2019/054574 dated Dec. 20, 2019.
Sutton et al., "Blockchain Enabled Privacy Audit Logs," Oct. 4, 2017, McMaster University, DOI: 10.1007/978-3-319-68288-4_38, pp. 1-17, accessed via <https://www.researchgate.net/publication/320203888>.
Bela Gipp et al. "Decentralized Trusted Timestamping using the Crypto Currency Bitcoin", Feb. 13, 2015.
International Search Report and Written Opinion issued in Application No. PCT/US2019/053874 dated Nov. 29, 2019.

* cited by examiner

FIG. 4 ns ations, are different in each
BLOCKCHAIN TECHNOLOGY FOR DATA INTEGRITY REGULATION AND PROOF OF EXISTENCE IN DATA PROTECTION SYSTEMS

RELATED APPLICATIONS

This application is related to U.S. patent application 16/249,761, entitled BLOCKCHAIN TECHNOLOGY FOR REGULATORY COMPLIANCE OF DATA MANAGEMENT SYSTEMS, filed the same day herewith. This application is also related to U.S. patent application 16/249,791, entitled LEVERAGING BLOCKCHAIN TECHNOLOGY FOR AUDITING CLOUD SERVICE FOR DATA PROTECTION COMPLIANCE, filed the same day herewith. All of the aforementioned applications are incorporated herein in their respective entireties by this reference.

FIELD OF THE INVENTION

Embodiments of the present invention generally relate to data protection. More particularly, at least some embodiments of the invention relate to systems, hardware, software, computer-readable media, and methods for facilitating regulatory compliance of data management systems and processes, and proof of existence in data protection systems.

BACKGROUND

Increasingly, the handling of user data by storage systems and data management systems is governed by various regulatory requirements, including those set by governments concerning security and privacy, such as the General Data Protection Regulation (GDPR) issued by the European Union (EU). As well, the handling of user data is controlled, in some instances at least, by organizations such as the Securities and Exchange Commission (SEC). Yet other bodies have promulgated still other rules and regulations concerning the handling of user data.

Such regulatory requirements may present challenges to enterprises and other entities and organizations involved in creating and handling data. As well, such requirements change between industries and verticals, are different in each country/state, and continuously change in time. This further complicates the ability of an enterprise, for example, to comply, and prove compliance, with the applicable regulations.

To illustrate, data protection systems today keep multiple copies of the data. In many cases, due to new regulations such as the GDPR for example, there is a need to prove that data did not exist at a certain point in time or that data did exist at a certain point in time. In more detail, new regulations like GDPR require that data management systems support what is sometimes referred to as 'the right to be forgotten,' that is, such systems must be able to demonstrate, that is, prove, that particular data, such as client personal records for example, have been deleted. Presently, however, it is not possible to make such a demonstration.

As well, it is not possible to prove that data, such as a backup copy, was not tampered with. For example, a signature can prove that the data is genuine, but the time of the backup can still be tampered with or altered, and a new backup with changed data can be stored instead of an old one. Thus, if the vendor restoring the data wants to manipulate data, it can do so. For example, in the case of a lawsuit, a vendor may need to prove that particular data was erased immediately after a request was issued. Presently, however, there is no ability to prove that the data which is restored was not tampered with by the vendor, and indeed was created at the time claimed.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for facilitating regulatory compliance of data management systems and processes, and proof of existence in data protection systems.

In general, example embodiments of the invention embrace, among other things, integration of blockchain technology into data protection systems in order to enable proof, at any point(s) in time, of the existence, or non-existence, of data. Some embodiments may additionally, or alternatively, employ integration of blockchain technology into data protection systems in order to enable proof that data has not been tampered with, or otherwise compromised. Embodiments of the invention may be employed with, or include, data protection systems, hardware, and software, such as, for example, Dell-EMC data protection products such as Avamar, Networker, Enterprise Copy Data Management (ECDM), Integrated Data Protection Appliance (IDPA), and PowerProtect. These are presented only by way of example however and, more generally, embodiments of the invention may be employed with, or include, any other data protection product.

In some example embodiments, a plugin of a data management element, such as a data protection product, enables the data management element to act as a node of a blockchain network, such as a private, enterprise blockchain network. The blockchain network may include a ledger, and an administrator. When a data protection process, such as a backup process for example, is performed by, or in connection with, a hash value is generated that describes the content, that is, the data, and metadata relating to the backup. Any suitable hashing algorithm can be used. One example is the sha-1 algorithm. The hash value, which is stored in the blockchain, may be generated, for example, by the data protection element that performs the backup process. A global key generator periodically creates a key that is also stored in the blockchain. Storing the key that was the last key created prior to the backup, in association with that backup, will prove that the backup was created after the key was generated. Because the keys may be generated on a regular basis, such as once per minute for example, it is a relatively simple matter to accurately demonstrate, to the minute for example, when the backup was created. Further, because the key is stored in the blockchain, the record of the time of creation of the backup, as established by the creation time of the key, cannot be altered.

Thus, for example, if a party claims that its data was not erased from a database, the party managing the data can prove that the data was in fact erased when the party asserted that it was. This can be done by restoring two backups, the backup that was made prior to the request to remove personal data, and the backup that was made after the request to remove the personal data.

The first restored backup can be hashed and the resulting hash compared with the hash stored in the blockchain for that first backup. If the two hashes match, it can be safely concluded that the restored data is the same as the data that was backed up. The same process can be performed for the second backup. The two restored, and verified, backups can then be compared to each other to then determine whether or not the personal data was actually deleted. If so, the personal data will appear in the first, earlier, backup, but not in the second, later, backup. Moreover, the relative times when the backups were stored can be readily determined from the keys that were stored in the blockchain with the hashes.

Advantageously then, embodiments of the invention may provide various benefits and improvements relative to conventional hardware, systems and methods. To illustrate, an embodiment of the invention may enable a party that is managing data to affirmatively establish that particular data in the control of that party was deleted, and the time that the particular data was deleted. Thus, more generally, an embodiment of the invention is advantageous inasmuch as it may establish, with a high level of certainty, that particular data management transactions did, or did not, take place. As well, an embodiment may enable a party to establish that restored data has not been tampered with or otherwise compromised. Further, an embodiment of the invention may be effective in establishing, and proving, the integrity of data after the data has been stored. Embodiments of the invention may improve the operation and effectiveness of existing data protection systems, methods, hardware, and software by integrating new data integrity functionality in those data protection systems, methods, hardware, and software.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of Example Operating Environments

The following is a discussion of aspects of example operating environments for various embodiments of the invention. This discussion is not intended to limit the scope of the invention, or the applicability of the embodiments, in any way. In addition to the following discussion, further details concerning example operating environments in which embodiments of the invention may be implemented are disclosed in the Related Applications.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
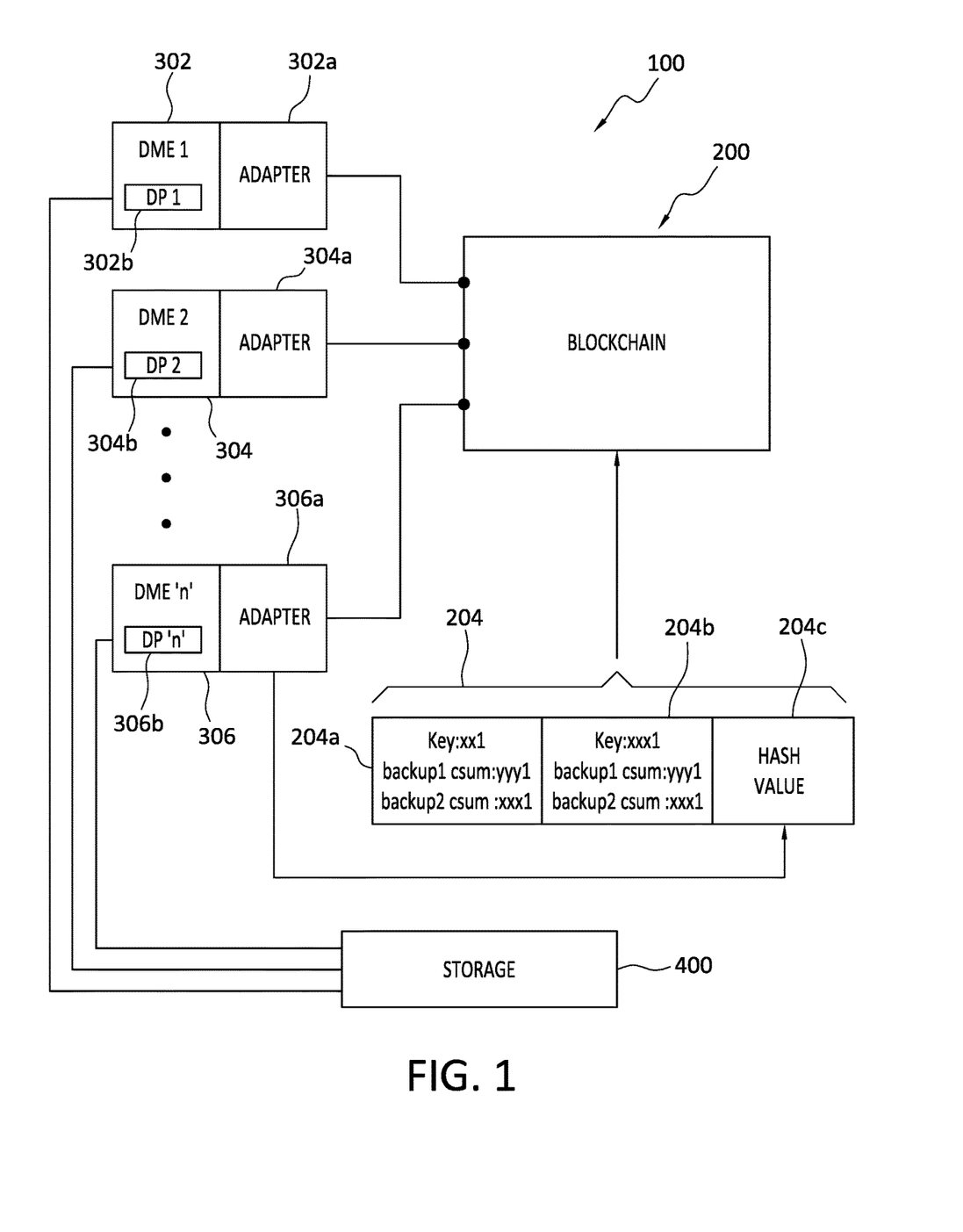
FIG. 1 discloses aspects of an example operating environment for some embodiments of the invention.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example configuration in FIG. 1 discloses an enterprise blockchain network 200 that functions as a distributed ledger in which one or more records 204 may be stored. In the illustrative example of FIG. 1, and as discussed below, the blockchain records include three records 204*a*, 204*b*, and 204*c*. The blockchain network 200 connects various data management elements 302, 304 and 306, examples of which include, but are not limited to data storage, data protection and data management systems. Each of the data management elements (DME) 302, 304 and 306 may include a respective adapter 302*a*, 304*a*, and 306*a*, which can take the form of a blockchain software plugin. Inclusion of the adapters 302*a*, 304*a* and 306*a* enables the corresponding DMEs 302, 304 and 306 to act as nodes of the blockchain network 200, and communications between the DMEs 302, 304 and 306 and elements of the blockchain network may take place by way of the respective adapters 302*a*, 304*a* and 306*a*.

In general, the DMEs 302, 304 and 306 may each operate to implement some type of data management process, such as a data protection process, examples of which include backup processes, archive processes, and restore processes. Other example data protection processes are disclosed elsewhere herein, and in the Related Applications. As such, example DMEs include, but are not limited to, a backup server, a backup and restore server, a cloning server, a deduplication server, and an archive server. In some instances multiple functions may be combined in a single DME. For example, a backup server may perform both data backup and data deduplication processes. In order to carry out their respective data protection functions, each of the DMEs 302, 304 and 306 may include one or more corresponding data protection (DP) applications, such as DP1 302*b*, DP2 304*b*, and DP3 306*b*. Thus, for example, DP1 302*b* may be a backup application, or a backup and restore application.

In at least some embodiments, one or more of the DMEs 302, 304 and 306 may communicate with a data protection environment in the form of a storage facility 400, one example of which is a cloud datacenter. In one example, the DME 302 may generate one or more backups which are then transmitted to the storage facility 400 and stored. The backups can later be restored from the storage facility 400 to one or more target entities, such as a client (not shown) with which the DME 302 communicates and whose data is backed up by the DME 302.

B. General Aspects of Some Example Operations

As noted, one or more of the DMEs 302, 304 and 306 may constitute a node of the blockchain network 200, and may operate in connection with the blockchain network 200.

In general, and as set forth in the following discussion, a blockchain network can serve as a distributed leger that is a unified source of truth for all data management transactions in the organization, for the purpose of auditing, regulatory compliance certification and verification of data existence or deletion. If for example, a user claims that his data was not erased from a database, the vendor can prove otherwise by restoring two backups, one before the request to remove personal data and one after the request to remove personal data. This will prove that the vendor did, in fact, erase the data at the time asserted, since the blockchain is public, at least in some embodiments, and cannot be tampered with.

As well, embodiments of the invention embrace systems and methods that can also be used to verify that backup copies were indeed created at the time it is claimed that they were created, using the backup hash in the blockchain, the system will prove that backup copy was created before the hash was stored to the blockchain. Leveraging the aggregate key that was stored in the blockchain, the system can prove that the backup was created after the key was inserted, thus proving a small window for the creation of the backup.

With continued reference now to the discussion of FIG. 1, further details are now provided concerning aspects of the operation of a DME such as the DMEs 302, 304 and 306, in conjunction with a blockchain network such as the example blockchain network 200. Among other things, the blockchain network 200, and associated processes disclosed herein and in the Related Applications, provide a mechanism by way of which an entity may obtain, and store, data management compliance information.

Among other things, example operations performed in connection with the disclosed operating environments and entities may involve operations that prove the existence, or non-existence, of particular data or datasets. As well, the existence, or not, of particular data or datasets can be established as of a particular time. For example, it may be demonstrated that particular data did, or did not, exist at a particular time.

Initially, a DME such as a backup server for example, may employ a backup application to create a backup of client and/or other data. Creation of the backup may also include creation of metadata concerning the backup, examples of which are disclosed in the Related Applications. The term 'metadata' is intended to be broad in scope and embraces not only metadata about the backup data itself, but also embraces transaction metadata, that is, information about a particular transaction involving, for example, a backup, such as creation of the backup.

It may be useful at some point to be able to establish when the backup was stored, and to establish the contents of the backup. With the former point in mind, embodiments of the invention may involve the periodic generation of keys, such as generation of a key once per minute, or on some other basis. The keys may be generated by the blockchain network, the DME, or any other suitable entity. The generated keys may be stored as respective blocks in the blockchain maintained by the blockchain network.

After a backup has been created by a DME, the adapter, or another element, of that DME may generate a hash of the backup data. The adapter may also examine the blockchain to identify the most recent key in the blockchain. The adapter may then use these various pieces of information, that is, the hash of the backup data, the most recent key, and the backup metadata, to generate an aggregate hash value that is then stored as a block in the blockchain.

In some embodiments, the hash of the backup data, and creation/storage of the aggregate key, are performed automatically, and immediately, after the backup has been generated. Thus, there is assurance that the aggregate key accurately reflects the backup creation time. As well, the aforementioned processes may be implemented in such a way that their performance cannot be delayed or otherwise interfered with, either directly or indirectly, by a human user. This approach may contribute to the integrity of the overall process, and process outputs, by helping to ensure that the aggregate key accurately reflects the backup creation time.

In this way, a record, in the form of the aggregate hash, is thus created that identifies the data in the backup, the time that the backup was created, and the metadata concerning the backup. Because information in the blockchain cannot be modified, the record is unalterable proof of the content of the backup, as well as proof of the time that the backup was created.

It should be noted that, for performance considerations, several backup transactions can be aggregated to a single blockchain data block, based on configurable parameters. Examples of such aggregations and parameters are disclosed in the Related Applications.

The example procedure outlined above can be applied to any data protection process, and may be repeated as needed for multiple instances of a data protection process, such as for multiple different backups for example. By restoring backups corresponding to respective records of the blockchain, an entity that manages the data can demonstrate both the content of the stored data, and the time that the data was backed up. As well, the entity can demonstrate when particular data existed, and when particular data was deleted.

To illustrate, first and second backups may be restored using their respective aggregate hashes stored in the blockchain. The first restored backup can be hashed and the resulting hash compared with the hash stored in the blockchain for that first backup. A match between the two hashes establishes that the restored data is the same as the data that was backed up since, if the restored data were different from the data that was backed up, the hashes would not match. That is, the hashes can be thought of as analogous to fingerprints, in that each hash uniquely corresponds to the particular set of data from which the hash was derived. The same process can be performed for the second backup. At this point, the contents of the two different backups have thus been verified to correspond with the two restored backups. Thus, the data management entity has established that the respective data of the two backups has not been modified since the time it was stored.

Embodiments of the invention are not limited to establishing data integrity however. Thus, the two restored, and verified, backups can then be compared to each other to determine whether or not particular data was actually deleted. If the particular data of interest has been asserted by the data management entity to have been deleted at a particular time, that data will appear in the backup preceding that particular time, but that data will not appear in the backup that was created after that particular time. In this way, the data management entity can establish whether particular data existed, or not, at the asserted time.

Moreover, the specific time(s) when particular data existed, or did not exist, can likewise be established with embodiments of the invention. Thus, a data management entity can affirmatively establish that, as of a particular time, particular data either existed, or did not exist. This assurance is achieved by way of the time-based keys that were stored in the blockchain. Because each key may have a timestamp or other metadata indicating when the key was created and stored, the aggregate hashes respectively corresponding to the two backups may be used to establish, relatively and/or absolutely, when the two backups were created. For example, if the first backup with particular data was created at time T1, and the second backup without that data was later created at a later time T2, the data management entity can establish that the data in question did not exist as of time T2 and, thus, was deleted sometime between T1 and T2.

By providing for selection of an appropriate time interval between creation of successive keys, embodiments of the invention may also enable accurate determinations to be made as to when, for example, data existed or did not exist. To illustrate, if the key corresponding to the backup created at time T1 was created one minute after the key corresponding to the backup created at time T2, it can be determined, to the minute, when the data that was in the backup of T1 was deleted, since it is known that such data was not in the backup created at time T2, and therefore was deleted sometime between T1 and T2.

As the present disclosure thus makes clear, the blockchain network 200 can serve as a unified source of truth for all data management transactions in the organization, for the purpose of regulatory compliance certification and/or other purposes. As well, storing the data protection operations on the blockchain network 200 leverages the blockchain capabilities as an implementation of a distributed ledger technology, that is secure, encrypted, immutable, that is, non-editable, and transparent.

C. Example Host and Server Configurations

Figure 2:
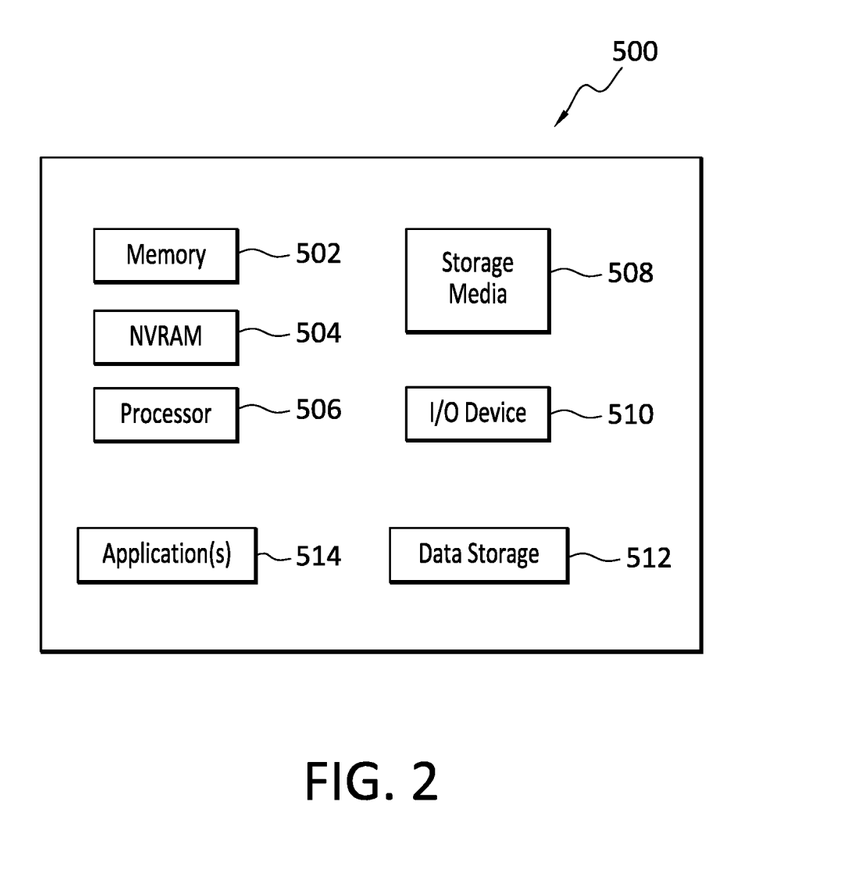
FIG. 2 discloses aspects of an example host configuration.

With reference briefly now to FIG. 2, any one or more of the blockchain network 200, data management elements 302 . . . 306, adapters 302*a* . . . 306*a*, applications 302*b* . . . 306*b*, and storage 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, and restore, operations and/or any other data protection operation, auditing operations, cloud service operation, blockchain operations, data management element operations, blockchain node operations, and blockchain ledger operations.

D. Example Methods

Figure 3:
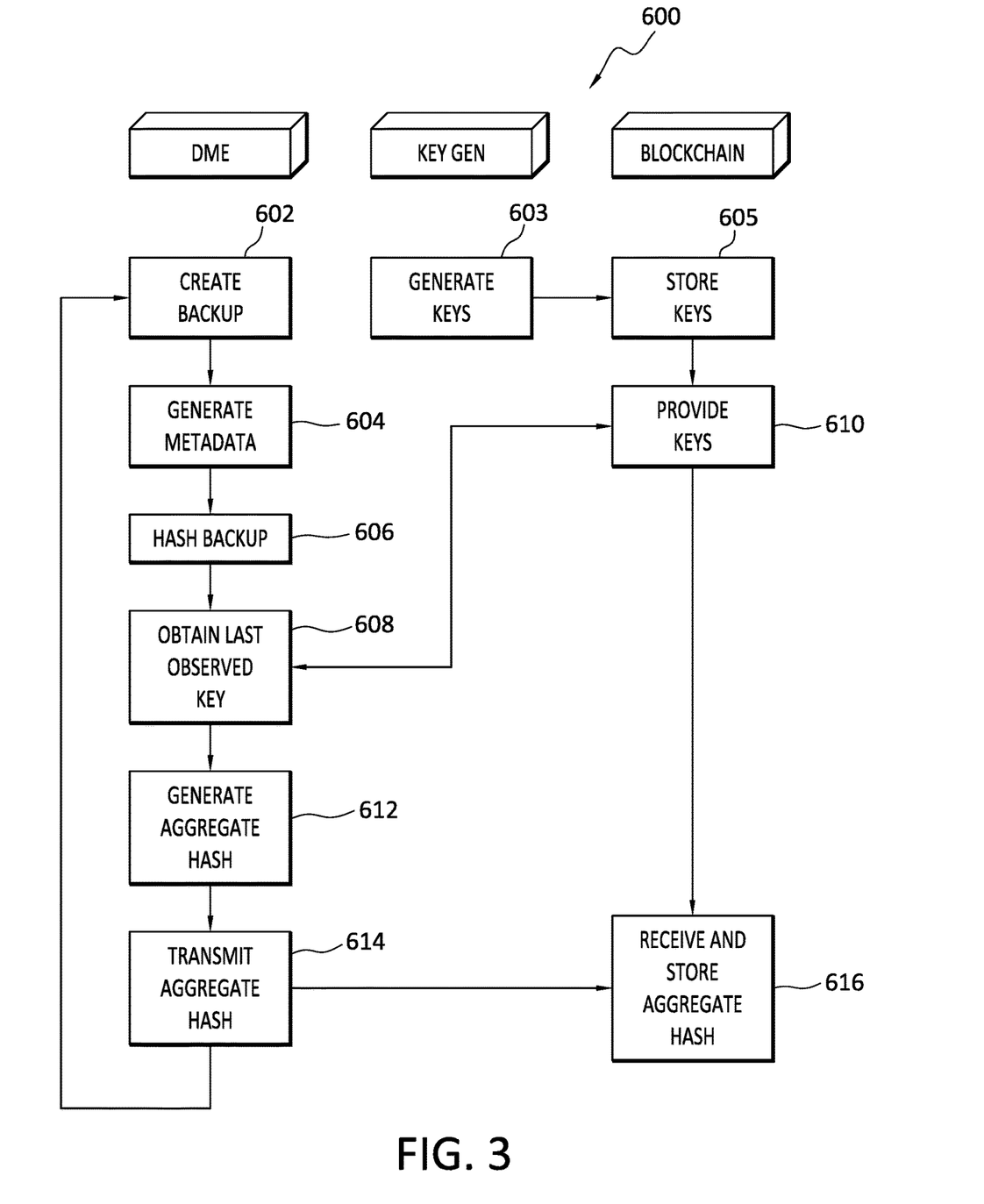
FIG. 3 is a flow diagram that discloses some general aspects of an example method for creation of records that may be used to demonstrate when data was stored, and/or when particular data existed, or did not exist.

With attention now to FIG. 3, aspects of example methods are disclosed. One particular method is denoted generally at 600 and concerns creation of records that may be used to demonstrate when data was stored, and/or when particular data existed, or did not exist. Embodiments of the method may also be used to demonstrate the integrity of stored data. The method 600 may be cooperatively performed by multiple entities, such as a DME and associated adapter, global key generator, and a blockchain network. However, the functional allocation indicated in FIG. 3 is provided only by way of example, and in other embodiments, the disclosed functions may be allocated differently amongst the various entities.

It should also be noted, that as with the other methods and processes disclosed herein and/or in the Related Applications, the order of the various processes in the method 600 may be different than the order indicated, and the disclosed processes are not required to be performed in the order indicated in the Figures. To illustrate, a key may be obtained before the backup is hashed, rather than after as presently indicated in FIG. 3. Finally, any of the disclosed processes may be performed in response to the performance of any one or more preceding processes. For example, generation of metadata may occur in response to the creation of a backup.

The method may begin at 602 when a data management element creates a backup of data. In conjunction with creation of the backup 602, the data management element may also create metadata 604 concerning the content of the backup and concerning such information as identity of the entity that created the backup, and a transaction ID, for example. At about the same time, and/or at one or more other times, a global key generator may periodically generate keys 603 that are then stored 605 as respective blocks in a blockchain of a blockchain network. The keys may, or may not, be hashed before being stored in the blockchain. In some embodiments, the keys are generated 603 on a regular, recurring, time interval, such as one key every minute for example. Shorter, or longer, time intervals may be used however.

After the backup has been created 602, and corresponding metadata generated 604, the backup is hashed 606. The resulting hash uniquely identifies the data of the backup. The method 600 then advances to 608 where a copy of the last observed key of the blockchain is obtained. The copy of the key may be provided 610 by the blockchain network.

An aggregate hash is then generated 612 based on the backup hash, the metadata, and the last observed key. For example, a hash may be generated on the following combination of elements: backup hash+metadata+last observed key. After the aggregate hash has been generated 612, it may be transmitted 614 to the blockchain network for storage as a block in the blockchain. In at least some embodiments, the processes 606, 608, 612, and 614, are collectively performed in as short a timespan as possible.

Figure 4:
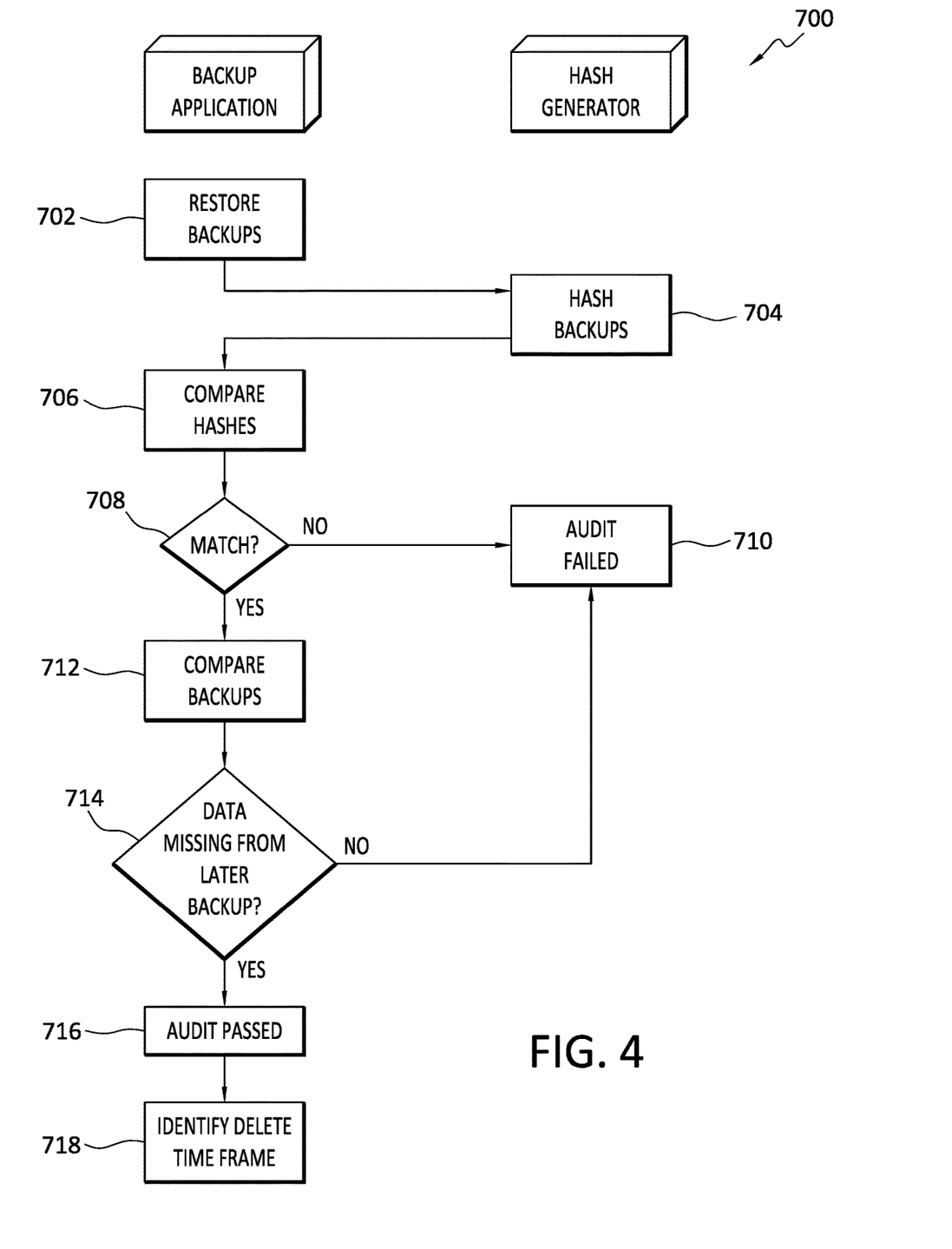
FIG. 4 is a flow diagram that discloses some general aspects of an example method for use of blockchain records to demonstrate when data was stored, and/or when particular data existed, or did not exist.

With attention now to FIG. 4, aspects of further example methods are disclosed. One particular method is denoted generally at 700 and concerns use of blockchain records, which may be in the form of aggregate hashes, to demonstrate when data was stored, and/or when particular data existed, or did not exist. Embodiments of the method may also be used to demonstrate the integrity of stored data that is, to establish that the data has not been tampered with or otherwise compromised after it was stored. The method 700 may be cooperatively performed by multiple entities, such as a DME and associated adapter, a backup and restore application, a hash generator, a global key generator, and a blockchain network. However, the functional allocation indicated in FIG. 4 is provided only by way of example, and in other embodiments, the disclosed functions may be allocated differently amongst the various entities.

The method 700 may begin in response to an audit or other request to a data management entity to demonstrate, for example, the integrity of data, whether particular data has been deleted, and/or when particular data was deleted. At 702, multiple different backups may be restored, such as from a storage facility. For illustrative purposes only, it will be assumed that first and second backups are restored 702. In at least some embodiments, the first backup restored is the last backup that was made prior to a request to delete particular data, and the second backup restored is the first backup that was made after that request. The time span between the creation of the two backups can be any size.

The restored backups are then each hashed 704, such as by way of a hashing algorithm and/or hash generator. The two hashes thus created 704 are then compared 706, respectively, with the backup hashes upon which the aggregate hashes of the two backups were based. If, for example, the newly created hash 704 of the first backup is determined 708 not to match the backup hash upon which the aggregate hash for the first backup was based, then the audit fails 710. That is, the audit has failed 710 because the restored data does not match the data that was backed up. From this result, it may be concluded that the backed up data at the storage facility was tampered with or otherwise compromised at some point after the backup was created. The determination process 708 may also be performed for the second backup.

If, on the other hand, it is determined 708 that the newly created hash of the restored backup matches the hash upon which the aggregate hash in the blockchain was based, then there is assurance that the backed up data has not been tampered with since it was stored. If a match of hashes is obtained for both of the restored backups, then the restored backups may be compared 712 to each other in order to identify what, if any, changes took place between the time that the first backup was created and the time that the second backup was created. Such a comparison process 712 may be useful for determining whether or not particular data included in the first backup was deleted at some point prior to the time the second backup was created.

As a result of the comparison process 712, a determination 714 may be made as to whether particular data in the first backup is missing from the second backup. Thus, for example, if the comparison 712 reveals that the particular data is present in both backups, then the audit, if an audit is performed, fails 710 because the data management entity has not demonstrated that the particular data in question was deleted at the asserted time, that is, between the time of creation of the first backup and the time of creation of the second backup.

On the other hand, if it is determined 714 that the data of interest, such as personal data, financial data, or any other data, is present in the first backup, but not present in the second backup, then the audit, if an audit is performed, passes 716 because the data management entity has demonstrated that the particular data in question was deleted at the asserted time, or at least sometime between the time of creation of the first backup and the time of creation of the second backup.

Finally, the particular time, or at least timeframe, that the data in question was deleted can be determined 718. This can be done, for example, by using the respective aggregate keys to identify a creation time T1 of the first backup and a creation time T2 of the second backup. Because the data in question was present at T1, but not present at T2, it can be concluded that the data was deleted sometime between T1 and T2. Where backups are created on a regular basis, such as every hour for example, it is possible to make relatively accurate determinations as to when the data was deleted.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
creating a backup of data;
creating metadata associated with the backup;
hashing the backup to create a backup hash;
obtaining a key from a blockchain of a blockchain network, wherein the key is associated with a creation time of the backup;
generating an aggregate hash of a combination comprising: the key; and, the backup hash, wherein information in the aggregate hash establishes that particular data did, or did not, exist in the backup as of a particular point in time; and
transmitting, by way of a blockchain plugin to a backup server, the aggregate hash to a blockchain network.

2. The method as recited in claim 1, wherein the aggregate hash forms the basis for a block in the blockchain.

3. The method as recited in claim 1, further comprising:
restoring the backup;
hashing the restored backup to create a second backup hash;
comparing the second backup hash with the backup hash to determine whether data of the restored backup matches the data in the backup;
restoring a second backup upon which a third backup hash is based;
hashing the restored second backup to create a fourth backup hash;
comparing the third backup hash and the fourth backup hash to determine whether data of the restored second backup matches data in the second backup; and
when data of the restored backup matches the data in the backup, and data in the restored second backup matches data in the second backup, comparing the data of the backup with the data of the second backup to determine whether or not data that is present in the backup is present in the second backup.

4. The method as recited in claim 1, wherein the key is a last observed key in the blockchain.

5. The method as recited in claim 1, wherein the key is one of a plurality of periodically generated keys.

6. The method as recited in claim 3, wherein comparison of the data of the backup with the data of the second backup enables a determination as to whether or not a particular data management transaction involving data of the backup took place.

7. The method as recited in claim 1, wherein an entity that performs part of the method comprises a node of the blockchain network.

8. The method as recited in claim 3, wherein the comparison of the data of the backup with the data of the second backup enables a determination as to what particular data of the backup was deleted, and when that particular data was deleted.

9. The method as recited in claim 1, wherein the combination from which the aggregate hash is generated further comprises the metadata associated with the backup.

10. A non-transitory storage medium having stored therein computer-executable instructions which, when executed by one or more hardware processors, perform the following operations:
  creating a backup of data;
  creating metadata associated with the backup;
  hashing the backup to create a backup hash;
  obtaining a key from a blockchain of a blockchain network, wherein the key is associated with a creation time of the backup;
  generating an aggregate hash of a combination comprising: the key; and, the backup hash, wherein information in the aggregate hash establishes that particular data did, or did not, exist in the backup as of a particular point in time; and
  transmitting, by way of a blockchain plugin to a backup server, the aggregate hash to a blockchain network.

11. The non-transitory storage medium as recited in claim 10, wherein the aggregate hash forms the basis for a block in the blockchain.

12. The non-transitory storage medium as recited in claim 10, further comprising:
  restoring the backup;
  hashing the restored backup to create a second backup hash;
  comparing the second backup hash with the backup hash to determine whether data of the restored backup matches the data in the backup;
  restoring a second backup upon which a third backup hash is based;
  hashing the restored second backup to create a fourth backup hash;
  comparing the third backup hash and the fourth backup hash to determine whether data of the restored second backup matches data in the second backup; and
  when data of the restored backup matches the data in the backup, and data in the restored second backup matches data in the second backup, comparing the data of the backup with the data of the second backup to determine whether or not data that is present in the backup is present in the second backup.

13. The non-transitory storage medium as recited in claim 10, wherein the key is a last observed key in the blockchain.

14. The non-transitory storage medium as recited in claim 10, wherein the key is one of a plurality of periodically generated keys.

15. The non-transitory storage medium as recited in claim 12, wherein comparison of the data of the backup with the data of the second backup enables a determination as to whether or not a particular data management transaction involving data of the backup took place.

16. The non-transitory storage medium as recited in claim 10, wherein an entity that performs part of the method comprises a node of the blockchain network.

17. The non-transitory storage medium as recited in claim 12, wherein the comparison of the data of the backup with the data of the second backup enables a determination as to what particular data of the backup was deleted, and when that particular data was deleted.

18. The non-transitory storage medium as recited in claim 10, wherein the combination from which the aggregate hash is generated further comprises the metadata associated with the backup.

* * * * *